W. J. EVANS.
MOTOR VEHICLE DRIVING MECHANISM.
APPLICATION FILED OCT. 28, 1914.
1,156,766.
Patented Oct. 12, 1915.
2 SHEETS—SHEET 1.
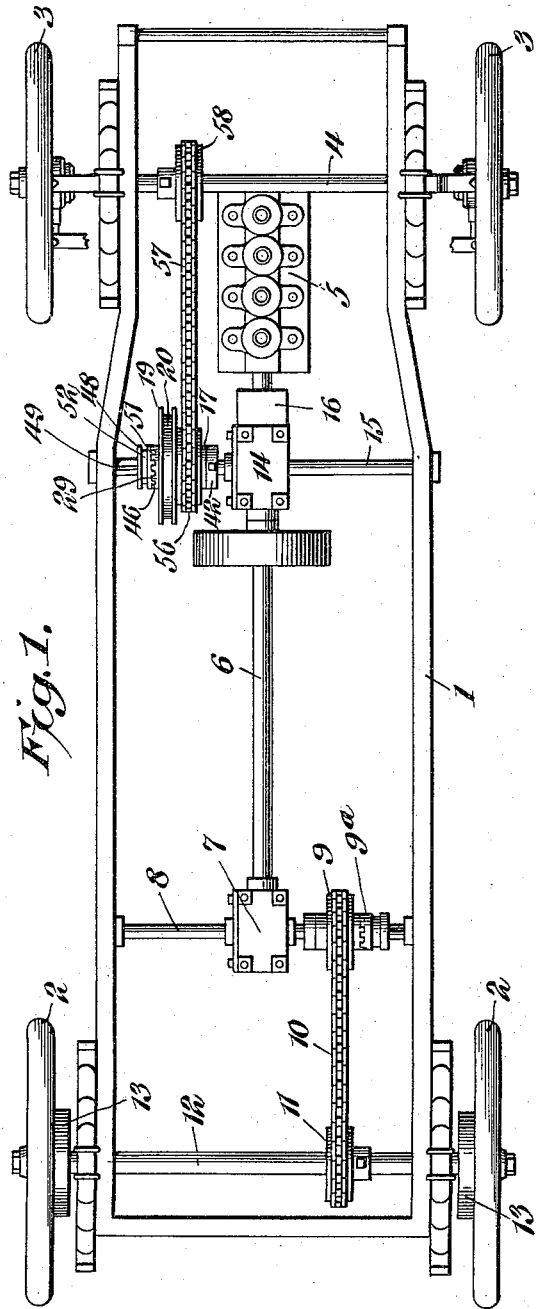
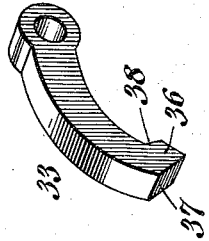
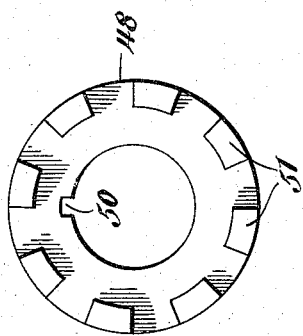
WITNESSES
Howard D. Orr.
F. T. Chapman.
William J. Evans,
INVENTOR,
BY E. G. Siggers.
ATTORNEY W. J. EVANS.
MOTOR VEHICLE DRIVING MECHANISM.
APPLICATION FILED OCT. 28, 1914.
1,156,766.
Patented Oct. 12, 1915.
2 SHEETS—SHEET 2.
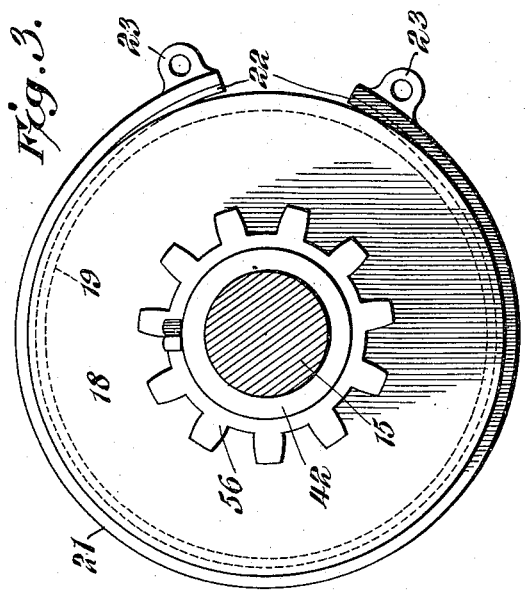
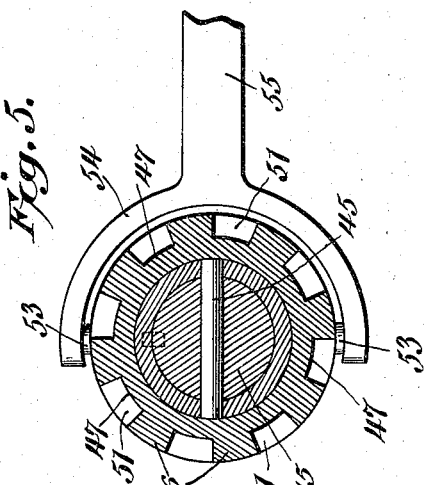
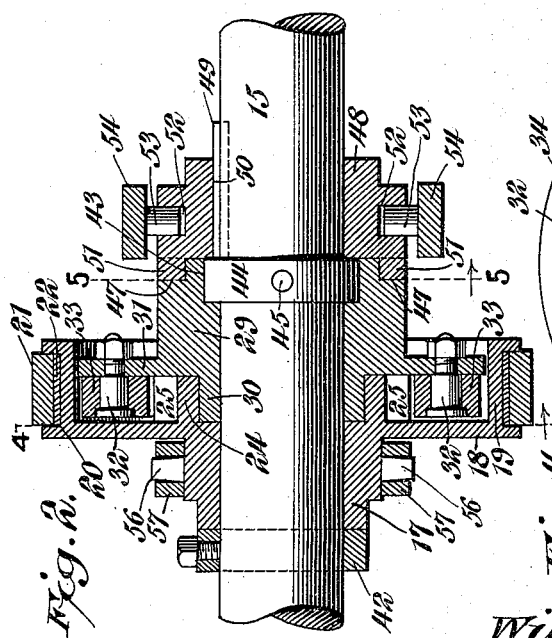
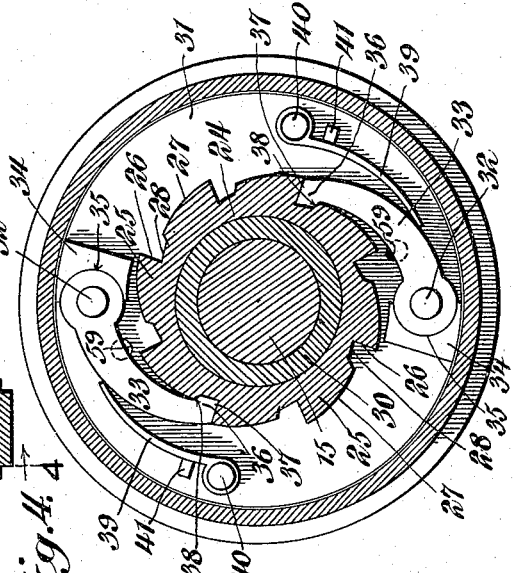
WITNESSES
Howard D. Orr.
F. T. Chapman
William J. Evans, INVENTOR,
BY
ATTORNEY

UNITED STATES PATENT OFFICE.

WILLIAM J. EVANS, OF PILOT MOUND, IOWA.

MOTOR-VEHICLE DRIVING MECHANISM.

1,156,766.  Specification of Letters Patent.  Patented Oct. 12, 1915.

Application filed October 23, 1914. Serial No. 869,106.

*To all whom it may concern:*

Be it known that I, WILLIAM J. EVANS, a citizen of the United States, residing at Pilot Mound, in the county of Boone and State of Iowa, have invented a new and useful Motor-Vehicle Driving Mechanism, of which the following is a specification.

This invention relates to motor vehicle driving mechanism, and is designed to provide an equalizer structure whereby steering wheel driving mechanism may be rendered effective in conjunction with ordinary rear wheel drives, so that a motor vehicle of ordinary commercial type may be readily changed to provide for the driving of the vehicle by either the rear wheels or the steering wheels, or both.

Any suitable steering wheel driving mechanism may be employed, as, for instance, such an arrangement as shown in Letters-Patent No. 1,045,778, granted to me on November 26, 1912, but such driving mechanism is to be taken simply as an example of any suitable steering wheel driving mechanism.

In order to adapt the usual power units of automobiles for the purposes of the present invention, there is provided an equalizer structure designed to equalize the draft on all four wheels of the motor vehicle. For this purpose the equalizer is in the nature of a one-way pawl and ratchet clutch with a coupling designed to be under the control of the operator for connecting the equalizer to the steering wheel drive, so that the engine of the vehicle may be utilized not only to drive the vehicle by the rear wheels, but by the front or steering wheels, and any overrunning of the front wheels is readily taken care of by the equalizer. Under some circumstances it may be desirable to utilize the rear wheels only for propelling the vehicle, in which case the equalizer is disconnected from the engine, wherefore the front wheels then act in the ordinary manner except that the equalizer is provided with a brake, so that the front wheels may be utilized for braking purposes, as well as the rear wheels, which are assumed to be provided with the usual brake.

In accordance with the present invention the equalizer is so constructed that in the case of overrunning the travel of the pawls from tooth to tooth of the ratchet is not productive of obtrusive noises, while at the same time the engaging portions of the pawl and ratchet connection are of ample area to transmit all the power needed.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a plan view of so much of an automobile chassis as is necessary for an understanding of the present invention, which latter is shown applied. Fig. 2 is a longitudinal section of the equalizer with the counter-shaft upon which it is mounted shown in elevation. Fig. 3 is an end view of the equalizer as seen from the sprocket wheel side with the counter-shaft shown in cross-section. Fig. 4 is a section on the line 4—4 of Fig. 2. Fig. 5 is a section on the line 5—5 of Fig. 2. Fig. 6 is an elevation of the movable member of the coupling. Fig. 7 is a perspective view of one of the equalizer pawls.

Referring to the drawings, there is shown a frame 1 which may be taken as indicative of the chassis frame of an ordinary automobile and mounted on this frame are rear wheels 2 and front or steering wheels 3, the latter being provided with a driving shaft 4 and connected to this shaft by mechanism such as shown in the aforesaid Letters-Patent, or any other suitable mechanism for a like purpose, so that the steering wheels may be utilized both as steering wheels and driving wheels. Since the details of such mechanism do not enter into the present invention no showing thereof is attempted, for the showing of the Letters-Patent referred to is considered as sufficient for an understanding of the present invention.

In Fig. 1 there is shown an engine 5 with its drive shaft 6 leading through direction-changing mechanism which may be considered as housed within a casing 7 and there driving a counter-shaft 8 in turn carrying a sprocket wheel 9 coupled to the shaft 8 by a clutch 9ª, or otherwise, and connected by a chain 10 to another sprocket wheel 11 driving the rear axle 12, which in turn imparts motion to the rear drive wheels 2, suitable brakes 13 being indicated in the drawing.

No attempt is made at any details in the showing of the parts described, since these parts may follow the usual construction, and in themselves have nothing to do with the present invention. The drive shaft 6 also carries other direction-changing mechanism indicated by a casing 14 near the engine 5 and this direction-changing mechanism is assumed to drive a counter-shaft 15 provided with suitable journal supports in the frame 1.

No attempt has been made to show the usual transmission and differential mechanisms, and it is assumed that the main shaft 6 is provided with transmission mechanism of the usual type simply indicated by a casing 16 thereon.

Mounted on the counter-shaft 15 is a hub 17 provided near one end with a radial flange 18 having an axially extended offset 19 with a circumferential groove 20 designed to receive a brake band 21 which in the particular showing of the drawings is provided with a friction shoe 22. The brake band is provided at the ends with ears 23 for the attachment of suitable connections leading to a convenient point within reach of an operator. As these connections may be such as are usually employed in band brakes on automobiles it is deemed unnecessary to show them. Projecting from that face of the flange 18 remote from the body of the hub 17 is an annular continuation 24 of the hub in surrounding spaced relation to the shaft 15, and on the outer peripheral portion of the continuation 24 there is formed an annular series of ratchet teeth 25 each provided at one end with a substantially radial shoulder 26. These teeth instead of sloping gradually from the apex toward the shoulder of the next tooth are rounded on the outer face, as shown at 27, and then adjacent to the next preceding tooth this rounded surface is interrupted by a notch or depression 28 merging into the shoulder 26 of the preceding tooth. Each one of the ratchet teeth therefore is notched or depressed where joining the next preceding tooth, the purpose being to provide a deep seat for a pawl but in the event of the teeth riding idly under a pawl the fall of the latter toward its seat is interrupted by engagement with the outer surface or periphery of the next tooth in order, so that the movement of the pawl is much less than is usual and any noise which might be caused by the idly running teeth on the pawl is so much reduced as to be unobtrusive.

Mounted on the shaft 15 adjacent to the hub 17 is another hub 29 having an axial continuation 30 telescoping into the space between the continuation 24 and the shaft 15. The hub 29 is formed with a radial flange 31 entering the space within the offset or overhang 19 of the flange 18. Mounted at diametrically opposite points on the flange 31 are pins or studs 32 projecting toward the flange 18 and each stud 32 extends through one end of a pawl 33 and constitutes a pivot support for the latter. Adjacent to each pin 32 the flange 31 is provided with an offstanding block 34 with one edge 35 concentric with the pin 32 and snugly yet freely receiving the corresponding end of the pawl 33 which is also usually made concentric with its pivotal axis so that the block 34 constitutes an abutment for the pawl relieving the pin 32 from excessive strains. Each pawl 33 has the free end formed with an offset 36 adapted to enter the recesses 28 at the rear ends of the teeth 25, while the extremity of the pawl is formed with a face 37 at a suitable angle to abut against the shoulders 26. That side of the offset toward the pivoted end of the pawl is beveled, as indicated at 38, and the corresponding wall of each recess 28 where projecting into the peripheral portion 27 of each ratchet tooth is correspondingly beveled, the angle of the bevel being such that the pawl nose readily rides out of the recesses 28 when the ratchet made up of the teeth 25 moves in the idle direction. Each pawl is urged toward the ratchet teeth by a spring 39, one end of which is carried by a stud 40 projecting from the flange 31, and the other end of which bears against the pawl 33. In order to hold the spring against the pawl a stop stud 41 is provided for each spring on the flange 31.

Fast to the shaft 15 is a collar 42 against which the corresponding end of the hub 17 engages, while that end of the hub 29 remote from the collar 42 is counter-bored, as indicated at 43, for the reception of another collar 44 held to the shaft 15 by a transverse pin 45. By this means both hubs and the parts carried thereby are free to move together or independently upon the shaft 15, or the latter may rotate without imparting motion to either the hubs 17 or 29 or the parts carried thereby, these hubs and the structures which they carry constituting an equalizer as will hereinafter appear.

The end of the hub 29 adjacent to the collar 44 is formed with a circular series of axially projecting teeth 46 separated by spaces 47. Mounted on the shaft 15 is a collar 48 held to the shaft by a key 49 seated in a groove in a shaft and a corresponding groove 50 in the collar, so that the collar may be moved lengthwise of the shaft, but is constrained to always rotate therewith. The collar is formed with a circular series of axially projecting teeth 51 adapted to enter the recesses 47 between the teeth 46, while the movement of the collar 48 lengthwise of the shaft 15 is sufficient to cause the engagement of the teeth or the removal of the collar sufficiently away from the hub 29 to disengage therefrom. The collar 48 is provided with a circumferential peripheral groove 52 entered by diametrically opposite pins 53 on a yoke 54 at one end of a manipulating member 55 which may be considered as provided with suitable connections within reach of an operator, whereby the collar 48 may be moved lengthwise of the shaft 15 for engagement with and disengagement from the teeth of the hub 29. The hub 17 is formed on the side of the flange 18 toward the collar 42 with a circumferential series of sprocket teeth 56 receiving a sprocket chain 57 engaging a sprocket wheel 58 on the shaft 4.

Let it be assumed that the engine 5 is running, and it may be further assumed that the shaft 15 is rotating at a speed which may correspond to that of the engine shaft, or in the case of the interposition of transmission gearing the shaft may be considered as running at some other speed. In the ordinary propulsion of the vehicle power may be transmitted to the driving wheels 2 only, but if it be desired to impart driving motion to the steering wheels 3, then the clutch member formed by the collar 48 is moved into engagement with the other clutch member formed by the teeth 46 and notches 47 and constituting a part of the hub 29. Now the hub 29 and parts carried thereby rotate with the speed of the shaft 15 and as the direction of rotation is such as to cause the noses of the pawls 33 to lodge against the shoulders 26 of corresponding ratchet teeth, the ratchet is caused to rotate with the hub 29 and as the ratchet is a part of the hub 17 the latter also rotates in the same direction. Motion is transmitted from the hub 17 by way of the sprocket teeth 56, and sprocket chain 57 to the sprocket wheel 58, and from the latter to the shaft 4; thus imparting driving motion to the steering wheels 3. Considering the speeds of the wheels 2 and 3 to be in proper agreement, the vehicle is driven by all four wheels simultaneously, so that each wheel has a materially less driving load than is the case where the rear wheels only are employed for driving purposes. This is productive of economy in wear and tear, and especially economy in tires. There are conditions under which it may be advisable to use the front wheels only for tractive purposes, as, for instance, when the rear wheels rest upon soft or slippery ground, in which case the front wheels may be upon firmer ground, and hence be able to pull the vehicle out of the stalled position. Again, it may be advisable to employ a greater braking force than would be provided by the usual brake acting upon the rear wheels. In this case the collar 48 is moved to the inactive position and then the brake band 21 is tightened, whereupon there is resistance offered to the turning of the steering wheels 3 commensurate with the braking force applied to the offset 19, which thereupon serves as a braking drum.

In assembling the device the key 49 is first applied and then the collar 48 is placed upon the shaft 15 in engagement with the key 49. Then the loose collar 44 is moved upon the shaft and secured thereto by the loose pin 45. After this the member of the equalizer represented by the hub 29 with the pawls and springs carried thereby is moved upon the shaft until housing the collar 44. Then the other member of the equalizer represented by the hub 17 is moved upon the shaft until engaging the hub 29 with the extension 30 seated in the space or counterbore within the extension 24, and finally the collar 42 is applied and secured in the usual manner, as by a set screw or otherwise.

In order to permit the assemblage of the parts without interference by the pawls 33, the latter are held against the action of the springs 39, so as not to abut against the corresponding face of the extension 24 and ratchet teeth 25, by pins temporarily projected through holes 59 formed in the flange 31, these pins being afterward withdrawn to permit the pawls 33 to move into engagement with the ratchet teeth under the action of the springs 39. The extensions 24 and 30 coact to relieve the extension 24 of strains due to driving engagement of the pawls 33 with the ratchet teeth.

What is claimed is:—

1. An automobile provided with front and rear wheels, power means for propelling the automobile, driving connections between the power means and the rear wheels, and driving connections between the power means of the front wheels comprising two rotatable members, one provided with a one-way ratchet wheel, and the other with engaging pawls therefor, driving connections between the ratchet wheel member and the front wheels, and a counter shaft carrying the two rotatable members and arranged for connection to the power unit of the automobile.

2. In a front wheel driving mechanism for automobiles also provided with a rear wheel drive, an equalizer therefor comprising two rotatable members one provided with a one-way ratchet wheel and the other with engaging pawls therefor, the ratchet wheel member of the equalizer being also provided with means for the transmission of power to the front wheels, and a counter-shaft carrying the equalizer and arranged for connection to the power unit of the automobile, the member of the equalizer provided with the ratchet wheel being also provided with a brake member.

3. In a front wheel drive for automobiles also provided with a rear wheel drive, an equalizer for the front wheel drive comprising a counter-shaft connected to the power unit of the automobile, two rotatable members both loosely mounted on the counter-shaft, one of the rotatable members having means for driving connection to the front wheels, and said members having respective pawl and ratchet engaging means, and a clutch on the counter-shaft for coupling one of the members of the equalizer thereto.

4. In a front wheel drive for automobiles also provided with a rear wheel drive, an equalizer for the front wheel drive comprising a counter-shaft connected to the power unit of the automobile, two rotatable members both loosely mounted on the counter-shaft, one of the rotatable members having means for driving connection to the front wheels, and said members having respective pawl and ratchet engaging means, and a clutch on the counter-shaft for coupling one of the members of the equalizer thereto, that member of the equalizer having means for connection to the front wheel drive being also provided with braking means.

5. In a front wheel drive for automobiles also provided with a rear wheel drive, an equalizer for the front wheel drive comprising a shaft, a hub mounted loosely thereon and formed with a radial flange and with a ratchet wheel extending therefrom in overhanging spaced relation to the shaft, another hub telescoping into the ratchet wheel portion of the first-named hub and provided with a radial flange in spaced relation to the first-named flange, said second-named flange having pawls thereon in operative relation to the ratchet wheel and said second-named hub being provided with clutch teeth on the end remote from the flange, and a slidable clutch collar keyed to the shaft in operative relation to the teeth of the second-named hub, the first-named hub being also provided with means for the transmission of power therefrom.

6. In a front wheel drive for automobiles also provided with a rear wheel drive, an equalizer for the front wheel drive comprising a shaft, a front hub mounted loosely thereon and formed with a radial flange and with a ratchet wheel extending therefrom in overhanging spaced relation to the shaft, another hub telescoping into the ratchet wheel portion of the first-named hub and provided with a radial flange in spaced relation to the first-named flange, said second-named flange having pawls thereon in operative relation to the ratchet wheel and said second-named hub being provided with clutch teeth on the end remote from the flange, and a slidable clutch collar keyed to the shaft in operative relation to the teeth of the second-named hub, the first-named hub being also provided with means for the transmission of power therefrom, and the first-named flange being provided with a peripherally located axially extended overhang housing the second-named flange and formed at its exterior into a brake drum.

7. In a front wheel drive for automobiles also provided with a rear wheel drive, an equalizer comprising two rotatable members, one with a circular series of one-way ratchet teeth and the other with pawls for engaging the teeth, each ratchet tooth being provided with a pawl engaging shoulder at one end and a recess at the other extended toward the axis of rotation with the peripheral portion of the tooth continued to and stopping at the recess, and the pawl being provided with a nose adapted to abut the shoulder of a tooth and to enter the adjacent recess at the rear end of the next tooth in order.

8. In a front wheel drive for automobiles also provided with a rear wheel drive, an equalizer comprising two rotatable members one having a circular series of ratchet teeth and the other having pawls for engaging the teeth, each tooth terminating at one end in a substantially radial shoulder with the other end formed with a recess adjacent to the shoulder of the next tooth in order and said recess being extended toward the axis of rotation and the periphery of the teeth slanting toward and stopping at the recess, and each pawl having a nose portion with a projection toward the axis of rotation of a length to enter the recess.

9. In a front wheel drive for automobiles also provided with a rear wheel drive, an equalizer composed of two coacting rotatable members one formed with a circular series of ratchet teeth and the other carrying pivoted pawls and at the pivotal end of each pawl provided with an abutment block for relieving the pivot support of the pawl from strain, and a spring for each pawl having a stop member projecting from the part carrying the pawl and acting as an abutment for the spring.

10. In a front wheel drive for automobiles also provided with a rear wheel drive, an equalizer composed of two members, one of which is provided with a ratchet and the other with pawl means engaging the ratchet, the teeth of the ratchet each terminating at one end in a substantially radial engaging shoulder, and at the other end in a recess extended toward the axis of rotation with the remainder of the periphery of each tooth further from the axis of rotation than a direct line from the apex of the tooth to the bottom of the recess, and the pawl having a nose shaped in conformity with the recess.

11. In a front wheel drive for automobiles also provided with a rear wheel drive, an equalizer composed of two members, one of which is provided with a ratchet and the other with pawl means engaging the ratchet, the teeth of the ratchet each terminating at one end in a substantially radial engaging shoulder, and at the other end in a recess extended toward the axis of rotation with the remainder of the periphery of each tooth farther from the axis of rotation than a direct line from the apex of the tooth to the bottom of the recess, and the pawl having a nose shaped in conformity with the recess, the wall of the recess of the tooth remote from the adjacent shoulder of the next tooth in order and the corresponding portion of the extension of the nose of the pawl being similarly beveled to facilitate the escape of the pawl from the recess.

12. In a front wheel drive for automobiles also provided with a rear wheel drive, an equalizer comprising a shaft, a set collar thereon, a hub engaging the collar and provided with sprocket teeth with a radial flange terminating at the outer portion in an overhanging axially extended portion constituting a brake drum, and provided with a circular series of ratchet teeth in annular spaced relation to the shaft, another hub provided with an annular axial extension telescoping into the space between the shaft and the ratchet teeth and also provided with a radial flange adapted to house in the brake drum, said hub having clutch teeth at the end remote from the axial extension, pawls carried by the flange of the second-named hub with abutment members at their pivoted ends to take the strain from the pivots of the pawls, springs carried by the flange of the second-named hub for urging the pawls toward the ratchet, said flange being provided with stop members for the springs for holding them in engagement with the pawls, and a clutch member mounted on the shaft and provided with clutch teeth, said clutch member being movable lengthwise of the shaft to carry the teeth into and out of engagement with the clutch teeth on the second-named hub, each clutch tooth adjacent to the engaging shoulder of the next tooth in order being provided with a recess extended toward the axis of rotation, and each pawl having a tooth engaging nose thickened toward the axis of rotation in conformity with the recesses of the ratchet teeth.

13. An automobile provided with front and rear wheels, an engine, a drive shaft connected therewith, a countershaft interposed between the drive shaft and the rear wheels and having driving connections with both, and a counter-shaft between the drive shaft and the front wheels and having driving connections with both, the driving connections between the front wheels and the countershaft for driving them including a one-way structure imparting forward drive only to the front wheels, and the driving connections between the drive shaft and the front and rear wheels including means for connecting or disconnecting the front wheels or the rear wheels, or both, from the drive shaft.

14. An automobile provided with front and rear wheels, an engine, a drive shaft connected therewith, a counter-shaft interposed between the drive shaft and the rear wheels and having driving connections with both, and a countershaft between the drive shaft and the front wheels and having driving connections with both, the driving connections between the front wheels and the countershaft for driving them including a one-way structure imparting forward drive only to the front wheels, and the driving connections between the drive shaft and the front and rear wheels including means for connecting or disconnecting the front wheels or the rear wheels, or both, from the drive shaft, the front and rear wheels being also provided with independent braking means.

In testimony, that I claim the foregoing as my own, I have hereto affixed my signature in the presence of two witnesses.

WILLIAM J. EVANS.

Witnesses:
I. F. MARSH,
HANNAH NELSON.

Copies of this patent may be obtained for five cents each, by addressing the "Commissioner of Patents, Washington, D. C."